Nov. 8, 1960      A. R. LORDO      2,959,723
ELECTRICAL POWER SUPPLY
Filed Nov. 17, 1955
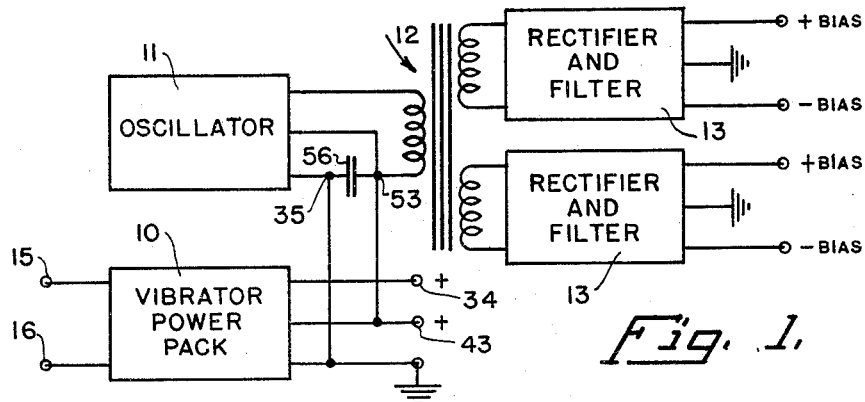
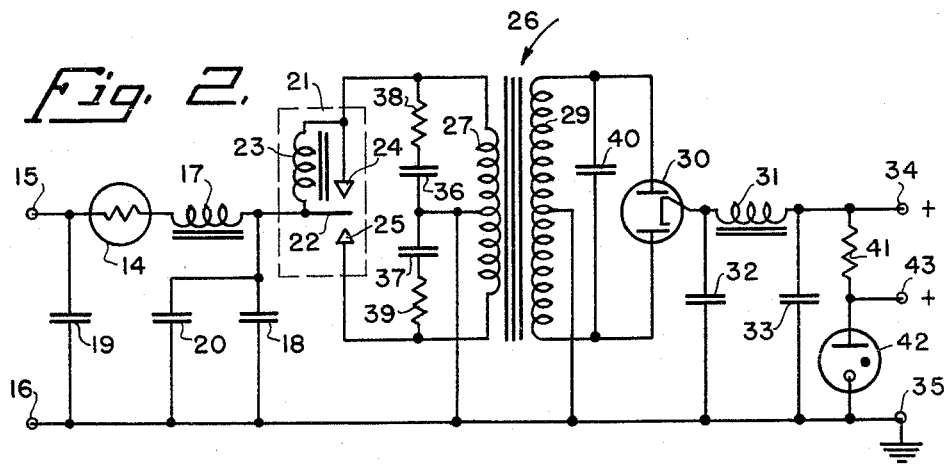
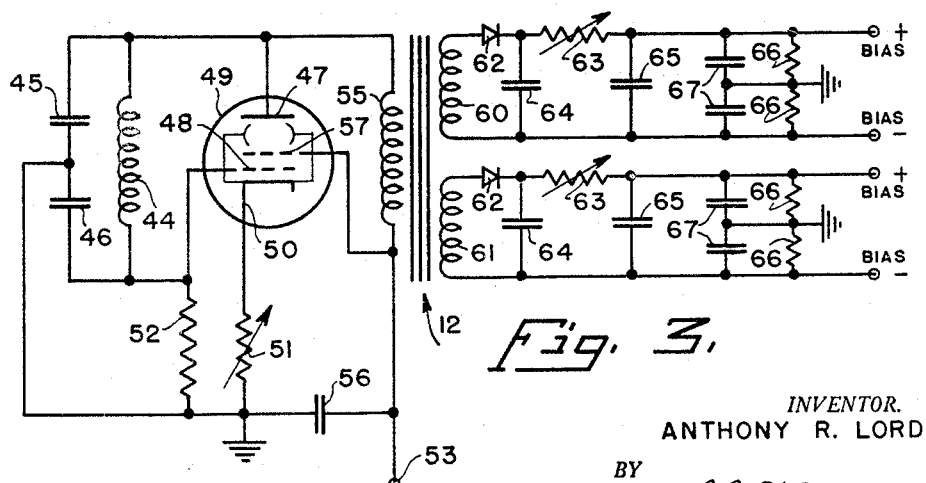
INVENTOR.
ANTHONY R. LORDO
BY
ATTORNEYS

United States Patent Office 2,959,723
Patented Nov. 8, 1960

2,959,723

ELECTRICAL POWER SUPPLY

Anthony R. Lordo, Sharon, Pa., assignor, by mesne assignments, to the United States of America as represented by the Secretary of the Navy Filed Nov. 17, 1955, Ser. No. 547,584

1 Claim. (Cl. 321—2)

This invention relates to electrical power supplies and more particularly to a D.C. power supply for developing stabilized high and low voltages for use in electronic equipment.

The invention will be described with brief reference to its use in acoustic-homing torpedoes in particular, but it is to be understood that it is not limited to such environment but rather can be employed in connection with many other electronic equipments.

As used in certain acoustic-homing torpedoes, power supplies of vibrating-interrupter type, hereinafter termed vibrator power packs, have been designed to operate from the same battery which powers many other components of the torpedo, and to deliver several D.C. plate and bias voltages for the thermionic devices of the torpedo's electronic gear. The bias voltages are of both positive and negative polarity relative to the common ground reference, as required in the acoustic-homing torpedo and in other specialized electronic equipment. The conventional design of these vibrator power packs for such application has been unsatisfactory in certain respects, principally as to instability of its bias voltages with variation of load in the higher voltage circuits. In particular, the vibrator power pack has heretofore often employed a transformer having several secondary windings in order to obtain plate and bias voltages as stated above, these windings being used with separate rectifying and filter circuits to supply the several D.C. voltages. Such technique, however, has been found to allow cross-talk or interaction between the several voltage outputs under certain conditions, resulting in the above-mentioned voltage instability.

The principal object of the present invention, therefore, is to provide an electrical power supply yielding several output voltages which are relatively free of load interaction effects producing voltage instability.

It is another object to provide a D.C. power supply capable of developing and delivering a plurality of stabilized bias voltages.

Other objects and many of the attendant advantages of this invention will be readily appreciated as the same becomes better understood by reference to the following detailed description when considered in connection with the accompanying drawings wherein:

Fig. 1 illustrates in block diagram form the complete D.C. power supply, indicating the novel circuit arrangement of the major components thereof, in accordance with the present invention;

Fig. 2 is a schematic of a vibrator power pack, detailing the circuitry which may be employed in this unit to develop the relatively high voltages; and Fig. 3 is a schematic of a novel circuit arrangement of an oscillator-type of power supply having several bias voltage outputs in accordance with the present invention.

Conventional regulated bias supply circuits are known which are capable of developing and delivering an adjustable and precisely regulated or stabilized D.C. output voltage, characterized by the use of gaseous and high-vacuum regulator tubes and often a control tube in circuits which are relatively complex and which therefore require a considerable number of components. Such bias supplies are often further unsuitable in certain applications, as in acoustic-homing torpedoes where space is at a premium, because of limited capability in the respect that they can provide only the one regulated voltage output, so that the bias supply section of a power pack, to provide several voltage outputs and using such regulation technique, would require at least a like number of secondary windings, a like number of rectifier and filter circuits, and more importantly with respect to one of the advantages of the present invention, a like number of voltage regulation circuits.

The necessity for such equipment multiplication is overcome by provision of power supply equipment in accordance with the present invention, having novel circuitry which is block-diagrammed in Fig. 1 as a typical embodiment, further detailed in Figs. 2 and 3.

Referring first to Fig. 1 in particular, the complete D.C. power supply comprises a vibrator power pack 10 which may be conventional in circuitry, an oscillator 11 which, except for its heater circuit, is energized from the vibrator power pack, an oscillator transformer 12 having one or more secondary windings as shown, and associated rectifier and filter circuits 13 as necessary to provide smoothed D.C. output voltages suitable for use in biasing or similar applications.

The vibrator power pack per se, schematically detailed in Fig. 2, employs a regulator tube 14 in its primary circuit to compensate for relatively long-term variations in voltage of the battery (not shown) which, when connected to input terminals 15 and 16, serves as the source of electrical power for this equipment. The filter elements in the input circuit, including R-F choke 17 and by-pass capacitor 18, serve to prevent the vibrator-induced voltage transients from reaching and affecting other utilization circuits which may be connected to the same battery source from which the vibrator power pack is energized. Capacitors 19 and 20 are of relatively large capacity and serve principally to stabilize the voltage of the input source as applied to the vibrator circuit. The vibrator unit itself is indicated at 21, in which a conductive magnetic reed 22, usually mechanically tuned, is arranged as an armature for the magnet-coil 23. This unit is shown as of non-synchronous type, employing a single pair of contacts 24, 25 between which the reed 22 is centered when quiescent. When energized, the vibrator unit serves to apply battery voltage pulses alternately to the two sections of the primary of transformer 26. When the battery circuit is first closed, through the upper section of the transformer primary 27, magnet-coil 23 pulls the reed against contact 24, causing a sudden increase in current through the upper section of primary 27 and simultaneously short-circuiting magnet-coil 23. The magnet-coil is thus de-energized and reed 22 swings back. Inertia carries the reed into engagement with the other contact 25, causing current to flow in the lower section of primary 27. Since reed 22 is kept in vibration between the two contacts 24 and 25, and thus causes application of essentially square pulses of voltage in alternating phase sequence to the transformer primary sections, an alternating voltage is developed in transformer secondary 29. This alternating voltage is rectified and filtered in conventional manner, for example by rectifier 30, filter choke 31 and capacitors 32 and 33, to provide a relatively high level of D.C. voltage between the output and ground terminals 34 and 35, respectively. Capacitors 36 and 37 and protective resistors 38 and 39 are provided across the primary sections as shown for the purpose of minimizing sparking between the reed and its contacts, to thus reduce transients resulting therefrom and to lengthen contact life. Reduction of spurious transients is also assisted by the use of a suitably sized buffer capacitor 40 across the transformer secondary 29. A series network comprising resistor 41 and gaseous voltage regulator tube 42 is preferably employed to provide a reasonably constant intermediate voltage at terminal 43 for use by the bias voltage supply section next described.

Referring now to Fig. 3, the oscillator there shown may be of Colpitts type, in which the inductance 44 and the series capacitors 45, 46 connected thereacross form a frequency-determining circuit which may be designed to operate at such frequency that no interference will take place with other nearby equipment. This tuned circuit is connected between the plate 47 and control grid 48 of a vacuum tube 49 which may be of beam power amplifier type as indicated, for example the commercial type 7C5. The necessary oscillator feedback is obtained by connecting the junction of the series-connected capacitors 45, 46 to cathode 50, in this instance through cathode resistor 51. Grid resistor 52 serves as a D.C. return in the grid-to-cathode circuit. Energizing voltage from the power pack unit, preferably from terminal 43 as previously described, is applied to terminal 53 of the oscillator circuit, thence to plate 47 of the oscillator tube via the primary 55 of oscillator transformer 12. Primary 55 thus also serves as an impedance element in a filter which includes capacitor 56. Screen grid 57 is supplied with D.C. voltage from the same source, as shown. Cathode resistor 51 is not by-passed and therefore functions as a degenerative control having a stabilizing effect upon the output A.C. voltage of the oscillator. Where the energizing voltage applied to the oscillator is reasonably constant, degenerative resistor 51 is not essential, but it serves further as a convenient output voltage adjusting control. The heaters (not shown) of tubes 30 and 49 may, of course, be connected to any suitable voltage source, for example to appropriate taps on the same battery which serves as the source of power for the vibrator supply. The rectifier and filter circuits associated with secondaries 60, 61 of oscillator transformer 12 may be conventional, in this instance each employing a germanium diode 62 and a filter system including resistor 63 and capacitors 64, 65. Output voltages of both positive and negative polarity and of equal magnitude are obtained from each of the rectifier-filter circuits by means of a pair of resistors 66 connected as a center-grounded potential divider across the filter output, each resistor being shunted by a capacitor 67 for filtering purposes. Filter resistors 63 may be variable as shown to serve as alternate or auxiliary means for adjusting the magnitudes of bias voltages delivered by this oscillator-type bias supply.

In an instance of typical design for use in an acoustic-homing torpedo, the vibrator power pack section operates from a 24-volt torpedo battery and delivers 150 volts and 180 volts, and the bias voltages available at the output terminals of the rectifier-filter units are of 45-volt magnitude.

Basically, the excellent stability characteristics of the D.C. bias output voltage of the above-described power supply combination is attributable to the use of a power pack, having several D.C. voltage outputs, and preferably including a regulated voltage output having a fair degree of stability despite variations in power drawn from the power pack or from its supply source by various utilization circuits, and an oscillator-rectifier type of bias supply energized by the latter voltage and inherently relatively insensitive to small changes in that voltage. The resultant power supply combination thus involves far less equipment than can conventionally be employed to yield D.C. plate supply voltages and bias voltages having a high degree of stability as here provided, for in addition to the otherwise conventional power pack, the combination is completed by the oscillator-rectifier arrangement employing very few components as shown in Fig. 3 and which can of course be made quite compact.

It is to be understood that, in the above-described combination, oscillators and vibrator power supplies of types other than that shown and described may be employed. For example, a vibrator power supply of synchronous type may be utilized, wherein the vibrator unit also functions as the rectifying means for the secondary circuit. Similarly, the concept of an oscillator source of bias voltages may be embodied in other types of oscillator circuits, and may in fact be made more compact by transistorization. Further, while most conveniently and advantageously supplied by a power pack of vibrator type, the voltage required for energization of the oscillator as here described may, of course, be derived from any other suitable source.

Obviously, many modifications and variations of the present invention are thus possible in the light of the above teachings. It is therefore to be understood that within the scope of the appended claims the invention may be practiced otherwise than as specifically described.

What is claimed is:

A D.C. plate and bias power supply comprising, in combination: a vibrator type of power pack yielding a regulated D.C. voltage; a single-tube oscillator employing inductor means in its oscillation-determining circuit; transformer means having a primary winding distinct from said inductor means; a rectifier circuit adapted to convert A.C. voltage to an output D.C. voltage; said oscillator being energized by said regulated D.C. voltage through the primary winding of said transformer means and providing an output A.C. voltage thereacross; said oscillator having a degenerative circuit consisting solely of an unbypassed cathode resistor, providing substantial A.C. output voltage stabilization; and said transformer means coupling the A.C. output voltage, provided by said oscillator, to said rectifier circuit, and having a step-down ratio which brings said output D.C. voltage to a level below that of the D.C. voltage supplied by said vibrator type of power pack.

References Cited in the file of this patent

UNITED STATES PATENTS

| | | |
|---|---|---|
| 1,280,769 | Langmuir | Oct. 8, 1918 |
| 1,823,837 | Miessner | Sept. 15, 1931 |
| 1,835,121 | Rentscheler | Dec. 8, 1931 |
| 2,176,447 | Vilkomerson | Oct. 17, 1939 |
| 2,311,163 | Edwards | Feb. 16, 1943 |
| 2,427,491 | Blumlein | Sept. 16, 1947 |
| 2,565,621 | Olson | Aug. 28, 1951 |
| 2,584,850 | De Mers | Feb. 5, 1952 |
| 2,740,055 | Ziniuk | Mar. 27, 1956 |
| 2,742,580 | Holdt | Apr. 17, 1956 |